United States Patent [19]

Morris et al.

[11] Patent Number: 4,525,504
[45] Date of Patent: Jun. 25, 1985

[54] STABILIZED POLYESTER COMPOSITIONS SUITABLE FOR OUTDOOR APPLICATIONS

[75] Inventors: John C. Morris; Joseph S. Zannucci, both of Kingsport, Tenn.

[73] Assignee: Eastman Kodak Company, Rochester, N.Y.

[21] Appl. No.: 544,034

[22] Filed: Oct. 24, 1983

[51] Int. Cl.$^3$ .......................... C08K 5/34; C08K 5/07; C08K 5/10
[52] U.S. Cl. ...................... 524/99; 524/101; 524/102; 524/103; 524/208; 524/220; 524/222; 524/259; 524/291; 524/335; 524/336; 524/337; 524/338; 524/357; 525/437
[58] Field of Search ................. 524/99, 101, 102, 103, 524/208, 220, 222, 259, 291, 335, 336, 337, 338, 357; 528/272, 302, 307; 525/437

[56] References Cited

U.S. PATENT DOCUMENTS

| | | | |
|---|---|---|---|
| 3,529,982 | 9/1970 | Luethi et al. | 524/220 |
| 4,153,597 | 5/1979 | Wheeler et al. | 524/259 |
| 4,278,590 | 4/1981 | Dexter et al. | 524/100 |
| 4,363,908 | 12/1982 | Joyner et al. | 528/307 |

Primary Examiner—John Kight
Assistant Examiner—Kriellion Morgan
Attorney, Agent, or Firm—Gary C. Bailey; Clyde L. Tootle; Daniel B. Reece, III

[57] ABSTRACT

Disclosed are stabilized polyester compositions having significantly improved weatherability, said polyesters consisting of homopolyesters derived from a dicarboxylic acid component wherein at least a major portion of which is 1,4-cyclohexanedicarboxylic acid (or ester) having a trans isomer content of at least 65% and a glycol component wherein at least a major portion of which is 2,2,4,4-tetramethyl-1,3-cyclobutanediol and copolyesters thereof with modifying aliphatic glycols and/or aliphatic dicarboxylic acids, said polyesters being stabilized with the combination of at least one ultraviolet light stabilizing compound compatible with said polyester and at least one hindered amine light stabilizer having the formulae

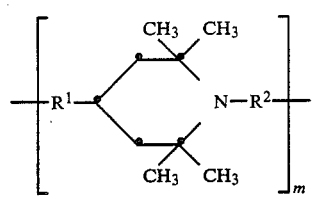

I or

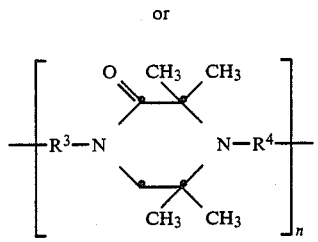

II the groups shown as $R^1$, $R^2$, $R^3$ and $R^4$ are each independently selected from various substituents.

25 Claims, No Drawings

STABILIZED POLYESTER COMPOSITIONS SUITABLE FOR OUTDOOR APPLICATIONS

BACKGROUND OF THE INVENTION

This invention relates to a stabilizer system for polyesters and their commercially useful stabilized compositions which provide finished products having improved weatherability.

Polyesters of various compositions have been used extensively to prepare film, sheets and various molded, shaped or formed articles. In order for these various articles to be successfully used in outdoor applications they must retain their appearance, particularly with respect to gloss, transparency and shape and a reasonable amount of physical properties, i.e., impact strength, tensile properties, etc. Many of such articles, however, tend to degrade and the physical properties of the articles are reduced when exposed to outdoor conditions (e.g., ultraviolet light, heat, water and oxygen) over an extended period of time, thus rendering such articles less useful for most outdoor applications. Therefore, considerable effort has been directed to improving the weatherability of such polymeric compositions.

Generally the existing stabilizers and stabilizer combinations have not been effective in preventing surface degradation of polyester compositions for periods of time sufficient for outdoor applications. It is generally thought that a plastic suitable for outdoor use will have good retention of physical and appearance properties for at least 2000–3000 hours exposure in an accelerated weathering device such as an Atlas XWR Weather-Ometer ®. However, obtaining homopolyesters and copolyesters suitable for outdoor use—that is, polyesters which retain both the desired physical properties and appearance properties after long term outdoor exposure—has heretofore not been possible. Typically, articles formulated from polyester compositions stabilized with known stabilizers and stabilizer combinations retain the desired appearance and/or physical properties generally for less than 1000 hours exposure in an accelerated weathering device. Upon exposure for longer periods such polyester articles rapidly lose the desired appearance properties, i.e. becoming hazy, dull and often misshapen, and/or key physical properties, i.e. impact strength.

It has unexpectedly been found that articles formulated from certain aliphatic dicarboxylic acid based homopolyesters and copolyesters, when stabilized with selected conventional ultraviolet light (UV) stabilizers in combination with certain hindered amine light stabilizers (HALS), can withstand significantly longer periods of exposure under accelerated weathering conditions with good retention of both appearance properties (gloss, transparency, shape) and physical properties (impact and tensile strength) than has previously been possible. It should be readily apparent to those skilled in the art that polyesters having dramatically increased weatherability as exhibited by the polyesters of this invention will be especially suitable for use in many outdoor applications.

SUMMARY OF THE INVENTION

According to the present invention highly weatherable polyesters having a 264 psi heat deflection temperature greater than 60° C. are provided. The polyesters of this invention comprise A. a dicarboxylic acid component wherein at least a major portion of which is 1,4-cyclohexanedicarboxylic acid having a trans isomer content of at least 65%, B. a glycol component, wherein at least a major portion of which is 2,2,4,4-tetramethyl-1,3-cyclobutanediol, C. a stabilizing effective amount of the combination of
1. at least one ultraviolet light stabilizing compound compatible with said polyester, and
2. at least one hindered amine light stabilizing compound having the formulae

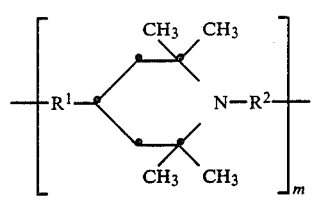

I or

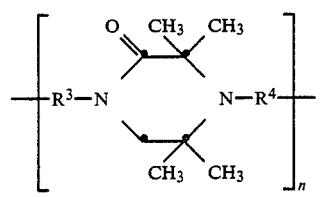

II wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

DETAILED DESCRIPTION OF THE INVENTION

The polyesters useful in this invention are prepared according to procedures well known in the art wherein a dicarboxylic acid or its ester is reactively combined with at least stoichiometric amounts of a polyester forming glycol under conditions of temperature, pressure and catalysis as to form the polyester.

The polyesters of this invention comprise a dicarboxylic acid component, at least a major portion of which is 1,4-cyclohexanedicarboxylic acid (or ester) and a glycol component, at least a major portion of which is 2,2,4,4-tetramethyl-1,3-cyclobutanediol, or copolyesters thereof with a second glycol and/or a second dicarboxylic acid as modifiers. The term "major portion" as used herein means that 1,4-cyclohexanedicarboxylic acid is present in an amount of at least about 80 mole % and that 2,2,4,4-tetramethyl-1,3-cyclobutanediol is present in an amount of at least about 70 mole %.

One or more glycols may be employed as modifiers in the polyesters of this invention. Said glycols (herein referred to as a second glycol) may be employed in amounts up to about 30 mole % based on a total glycol content of 100 mole %. Typical glycols which may be employed as a second glycol include the polymethylene glycols, preferably those containing from about 2 to 10 carbon atoms. Examples of these include ethylene glycol, 1,3-propanediol, 2,2-dimethyl-1,3-propanediol, 1,4-butanediol, 1,6-hexanediol, 1,4-cyclohexanedimethanol, 1,4-cyclohexanediol, and the like. Preferred is 1,4-cyclohexanedimethanol and especially preferred is 1,4-cyclohexanedimethanol having a trans isomer content of about 70%.

One or more dicarboxylic acids may be employed as modifiers in the polyesters of this invention. Said acids (herein referred to as a second dicarboxylic acid) may be employed in amounts up to about 20 mole % based on a total dicarboxylic acid content of 100 mole %. Typical acids which may be employed as a second dicarboxylic acid include the aliphatic dicarboxylic acids containing from about 2 to 20 carbon atoms. Examples of such dicarboxylic acids include malonic acid, succinic acid, glutaric acid, adipic acid, suberic acid, azelaic acid, sebacic acid and the like. The 2,2,4,4-tetramethyl-1,3-cyclobutanediol component may be either the cis or trans isomer or mixtures thereof with a trans isomer content of at least 50% being preferred. The 1,4-cyclohexanedicarboxylic acid component has a trans isomer content of at least 65% and preferably 100% trans.

Each of the acids and glycols identified above are available commercially or they may be prepared by well-known procedures.

These polyesters have an ASTM (D648-56) 264 psi heat deflection temperature greater than 60° C. The inherent viscosity of the polyesters of this invention may vary depending on the specific application of the polyester composition. Generally these polyesters will have an inherent viscosity of at least 0.4 and preferably at least 0.6 to about 1.6 when measured at 25° C. using 0.5 grams of polymer per 100 ml of a solvent composed of 60/40 (wt/wt) phenol/tetrachloroethane.

The homopolyesters and copolyesters of this invention, as disclosed previously herein, have significantly increased weatherability when at least one UV stabilizer compatible with said polyesters in combination with at least one HALS having formulae I or II described hereinbefore are incorporated therein in stabilizing effective amounts. The use of either the UV absorbers or HALS other than in combination with each other fails to provide the dramatic increase in weatherability of these polyesters. It is therefore essential that at least one of the UV stabilizers and at least one of the HALS described herein be incorporated into the homo- and copolyesters of this invention, that is, in combination.

The stabilizing combination found particularly advantageous for these polyesters is the combination of (1) about 0.05 to about 2.0 percent by weight of at least one HALS compound of formulae I or II and (2) about 0.05 to about 5.0 percent by weight of at least one UV stabilizing compound compatible with said polyester based on the weight of the polyester material to which they are added. For economic reasons the polyesters are preferably stabilized with about 0.25 to about 0.5 weight percent of at least one HALS and about 0.5 to about 1.0 weight percent of at least one UV stabilizer as disclosed herein.

The HALS useful in the polyesters of this invention are based on the cyclic hindered amine compounds. Examples of these include 1,1'-[1,2-ethanediyl]-bis[3,3,5,5-tetramethylpiperazinone]; dimethylsuccinate polymer with 4-hydroxy-2,2,6,6-tetramethyl-1-piperidineethanol; bis(1,2,2,6,6-pentamethyl-4-piperidinyl)-sebacate; bis[2,2,6,6-tetramethyl-4-piperidinyl]decanedioate; bis(1,2,2,6,6-pentamethyl-4-piperidinyl)-2-[[3,5-bis(1,1-dimethylethyl)-4-hydroxyphenyl]methyl]-2-butylpropanedioate; poly[(2,2,6,6-tetramethyl-4-piperidinyl)iminomethylene(2,2,6,6-tetramethyl-4-piperadinyl)imino[6(octylamino)-1,3,5-triazine-4,2-diyl]]; 2,2,6,6-tetramethyl-4-piperidinyl benzoate; tetrakis(2,2,6,6-tetramethyl-4-piperidinyloxy)silane; and the like. Various HALS suitable for the polyesters of this invention are available commercially including Tinuvin ®292, Tinuvin ®622 and Tinuvin ®770 all of which are manufactured by Ciba-Geigy Corporation, Ardsley, N.Y.

The ultraviolet light stabilizers useful in the present invention are those ultraviolet light stabilizing compounds which ordinarily are compatible with polyesters in general. Preferred are those having the following formulae:

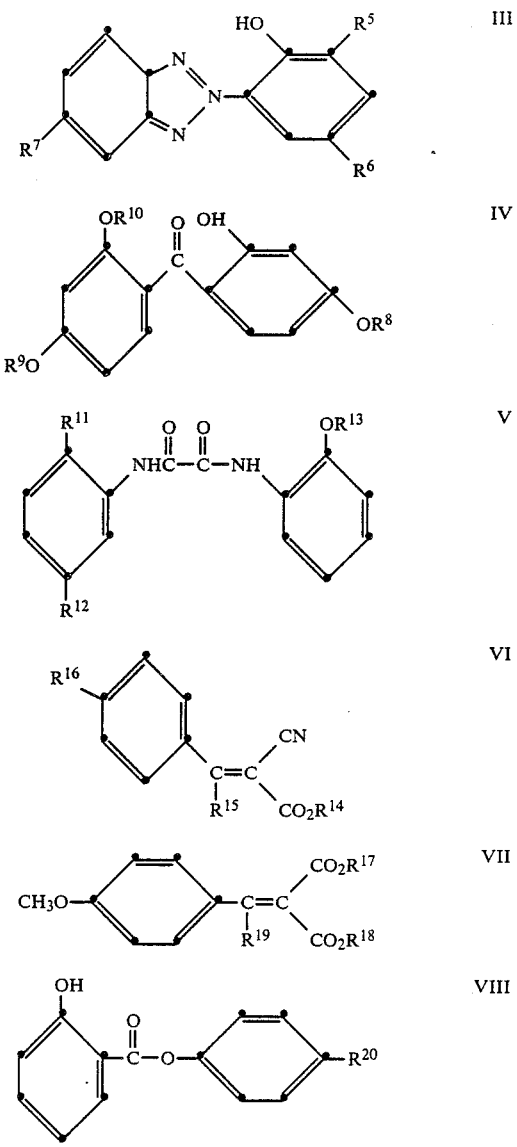

In the above formulae, $R^5$, $R^6$, and $R^7$ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; $R^7$ may additionally be chlorine or fluorine;

$R^8$, $R^9$ and $R^{10}$ are each independently selected from hydrogen, branched or unbranched, substituted or unsubstituted alkyl having 1 to 18 carbon atoms, and alkylenecarbonyloxyalkyl having 3 to 18 carbon atoms;

$R^{11}$, $R^{12}$ and $R^{13}$ are each independently selected from hydrogen and substituted or unsubstituted, branched or unbranched alkyl radicals containing from 1 to 10 carbon atoms;

$R^{14}$ and $R^{16}$ are each independently selected from substituted or unsubstituted alkyl containing from 1 to 18 carbon atoms, $R^{15}$ is hydrogen, methyl, or substituted or unsubstituted aryl having 6 to 22 carbon atoms, and $R^{16}$ is also substituted or unsubstituted alkoxy having 1 to 18 carbon atoms;

$R^{17}$ and $R^{18}$ are each independently selected from substituted or unsubstituted, branched or unbranched alkyl having 1 to 18 carbon atoms and $R^{19}$ is hydrogen or methyl;

$R^{20}$ is hydrogen, substituted or unsubstituted branched or unbranched alkyl or alkoxy having 1 to 18 carbon atoms.

The UV stabilizers of formulae III through VIII useful in the polyesters of this invention are based on 2-hydroxybenzotriazole (III), 2-hydroxybenzophenone (IV), oxanilides (V), esters of acrylic acid (VI), esters of malonic acid (VII), and aromatic esters of salicylic acid (VIII).

Examples of 2-hydroxybenzotriazoles useful in the present invention include: 2-(2'-hydroxy-5'-methylphenyl)benzotriazole; 2-(2'-hydroxy-3',5'-di-tert-butylphenyl)benzotriazole; 2-(2'-hydroxy-3',5'-di-tert-butylphenyl)-5-chlorobenzotriazole; 2-(2'-hydroxy-3',5'-di-tert-amylphenyl)benzotriazole; 2-(2'-hydroxy-3'-tert-butyl-5'-methylphenyl)-5-chlorobenzotriazole; 2-(2'-hydroxy-5'-tert-butylphenyl)benzotriazole; 2-(2'-hydroxy-3'-sec-butyl-5'-tert butylphenyl)benzotriazole; 2-(2'-hydroxy-5-tert-octylphenyl)benzotriazole; 2-(2H-benzotriazol-2-yl)-4,6-bis(1-methyl-1-phenylethyl)-pheniol; and the like.

Examples of 2-hydroxybenzophenones useful in the present invention include 2,4-dihydroxybenzophenone; 2-hydroxy-4-methoxybenzophenone; 2-hydroxy-4-tert-butoxybenzophenone; 2-hydroxy-4-octoxybenzophenone; 2-hydroxy-4-dodecyloxybenzophenone; 2-hydroxy-4-stearoxybenzophenone; 2-hydroxy-4-phenoxybenzophenone; 2-hydroxy-4-(β-hydroxyethoxy)benzophenone; 2-hydroxy-4-(2'-hydroxy-3'-acryloxypropoxy)benzophenone; 2-hydroxy-4-(2'-hydroxy-3'-methacryloxypropoxy)benzophenone; 2,2'-dihydroxybenzophenone; 2,2'-dihydroxy-4-methoxybenzophenone; 2,2'-dihydroxy-4-butoxybenzophenone; 2,2'-dihydroxy-4-octoxybenzophenone; 2,2'-dihydroxy-4-lauroxybenzophenone; 2,2',4,4'-tetrahydroxybenzophenone; 2,2',4'-trihydroxy-4-methoxybenzophenone; 2-hydroxy-4-methoxy-4'-chlorobenzophenone; 2,2'-dihydroxy-4,4'-dimethoxybenzophenone; 2-hydroxy-4-methoxy-2'-methyl-4'-hydroxybenzophenone; 2-hydroxy-4-methoxy-4'-tert-butylbenzophenone; 2-hydroxy-4-methoxy-4'-methyl-benzophenone; 2-hydroxy-4,4'-dimethoxybenzophenone; 2-hydroxy-4,4',2'-trimethoxybenzophenone; and the like.

Examples of oxanilides useful in the present invention include 2-ethoxy-2'-ethyloxanilide; 5-tert-butyl-2-ethoxy-2'-ethyloxanilide, and the like.

Examples of acrylic acid esters useful in the present invention include 2-ethylhexyl-2-cyano-3,3-diphenyl acrylate; 2-ethyl-2-cyano-3,3-diphenyl acrylate; butyl-2-cyano-3-methyl-3-(p-methoxyphenyl)acrylate; methyl-2-cyano-3-methyl-3-(p-methoxyphenyl)acrylate; and the like.

Examples of malonic acid esters useful in the present invention include the dimethyl and diethyl esters, p-methoxybenzylidine malonic acid; methyl-2-carbomethoxy-3-(p-methoxyphenyl)acrylate; and the like.

Examples of salicylic acid esters useful in the present invention include p-tert-octylphenyl salicylate; phenyl salicylate; carboxyphenyl salicylate; methylphenyl salicylate; 4-tert-butylphenyl salicylate; and the like.

Some of the various UV stabilizers suitable for the polyesters of this invention which are commercially available include Tinuvin® P, Tinuvin®326 and Tinuvin®144 manufactured by Ciba-Geigy Corporation; Cyasorb® UV-531, Cyasorb® UV-1988 and Cyasorb® UV-5411 manufactured by American Cyanamid Company, Bound Brook, N.J.; and Sanduvor VSU manufactured by Sandoz Corporation, East Hanover, N.J.

The stabilized polyesters of this invention may also contain other additives, pigments, colorants, mold releasing agents, fillers, antioxidants (such as Irganox®1010 manufactured by Ciba-Geigy Corp., Ardsley, N.Y.), phosphites (such as Weston®618 manufactured by Borg Warner Corporation, Parkersburg, W. Va.) and the like.

In the context of UV stabilizers and HALS having formulae I through VIII of the polyester compositions of this invention the terms alkylene, cycloalkylene, alkylenecarboxylic acid, alkylenearyl and alkylenecarbonyloxyalkyl are meant to identify divalent organic radicals.

It should be understood that the total acid reactants should be 100 mole % and the total glycol reactants should be 100 mole %.

Further there is provided in accordance with this invention a method of stabilizing homopolyesters and copolyesters derived from 1,4-cyclohexanedicarboxylic acid and 2,2,4,4-tetramethyl-1,3-cyclobutanediol. Thus, polyester compositions comprising a dicarboxylic acid component wherein at least a major portion of which is 1,4-cyclohexanedicarboxylic acid having a trans isomer content of at least 65% and a glycol component wherein at least a major portion of which is 2,2,4,4-tetramethyl-1,3-cyclobutanediol are stabilized by the method comprising the step of incorporating into said polyester composition a stabilizing amount of the combination of at least one hindered amine light stabilizing compound having formulae I or II and at least one ultraviolet light stabilizing compound selected from the group having formulae III through VIII, wherein compounds having formulae I through VIII are as previously defined herein.

The UV stabilizers and HALS employed in this invention may be incorporated into the polyesters disclosed herein by methods known in the art such as by melt blending, or adding onto the surface of the polyester material prior to formulating into the desired shaped article.

The stabilized homopolyesters and copolyesters of this invention may be formulated into articles of various forms by methods such as extrusion and injection molding well known in the art. These articles may further be oriented by techniques commonly known for orienting such polymeric materials.

The following examples are given to further illustrate the invention, but it is to be understood that the invention is not to be limited in any way by the details described therein.

EXAMPLE 1

This example illustrates the preparation of the polymer of 100 mol % trans-1,4-cyclohexanedicarboxylic acid, 70 mol % 2,2,4,4-tetramethyl-1,3-cyclobutanediol (67% trans), and 30 mol % 1,4-cyclohexanedimethanol.

A mixture of 180.0 g (0.90 mol) dimethyl trans-1,4-cyclohexanedicarboxylate, 103.7 g (0.72 mol) 2,2,4,4-tetramethyl-1,3-cyclobutanediol (67/33 trans/cis), 55.5 g (0.37 mol) 1,4-cyclohexanedimethanol (70/30 trans/cis), and 0.212 g dibutyl tin oxide are placed in a one-liter flask equipped with an inlet for nitrogen, a metal stirrer, and a short distillation column. The flask and contents are heated at 220° C. for about eight hours. The temperature is raised to 260° C. for ½ hour and a vacuum of 0.5 mm is gradually applied over the next 5–10 minutes. After four hours at 260° C., 0.5 mm the reaction is stopped to give a clear, very pale yellow almost colorless, high melt viscosity polymer with an I.V. of 0.66 and a Tg of 112° C.

EXAMPLE 2

The polyester of 100 mol % trans-1,4-cyclohexanedicarboxylic acid, 67 mol % 1,4-cyclohexanedimethanol (70/30 trans/cis), and 33 mol % 2,2,4,4-tetramethyl-1,3-cyclobutanediol (67/33 trans/cis) is prepared according to the procedure of Example 1. A clear colorless high melt viscosity polymer is obtained with an I.V. of 0.71 and a Tg of 88° C.

EXAMPLE 3

This example illustrates the procedure used to prepare weather stabilized polyester formulations.

The polyester from Example 1 was ground to pass a 3-mm screen and dried overnight at 70° C. in a vacuum oven. One hundred and ninety-eight grams of the polyester was then dry blended with 2.0 grams of 2-(2'-hydroxy-3',5'-di-tert-amylphenyl)benzotriazole, extruded at 235° C. in a Brabender ® extruder (C. W. Brabender, Hackensack, N.J.)., pelletized, dried and molded into ½ inch × 2½ inch × 1/16 inch bars. The bars were then exposed in an Atlas XWR Weather-Ometer ® according to ASTM Standard G.23. Visual appearance and flatwise impact strength (ASTM Standard D 256) were monitored.

EXAMPLES 4–15

Twelve polyesters were prepared using a procedure similar to that described in Example 1. Each of these polyesters was molded into ½ inch × 2½ inch × 1/16 inch bars using the procedure described in Example 3 and then exposed in an Atlas XWR Weather-Ometer. Examples 4 through 9, 11, and 13 represent polyesters stabilized with the combination of UV stabilizers and HALS as described in this invention. Examples 10 and 12 represent polyesters which contained no stabilizers, and Examples 14 and 15 represent polyesters stabilized with UV absorbers alone. These examples show the effect of using the herein described UV stabilizers and HALS in combination on retention of both physical and appearance properties, as represented by the percent loss in flatwise impact strength (FWIS) and by the number of hours to develop surface haze, of the polyesters of this invention. The results are shown in Table I. In each example more than 3000 hours exposure were required before surface haze developed. In those examples in which the combination of UV stabilizers and HALS was employed the percent loss in FWIS was dramatically reduced compared to the examples in which no stabilizers or UV stabilizers alone were used.

TABLE I

| No. | Polymer[a] | Stabilizer[b] Formulation | % Loss In FWIS[c] On 2000 Hr. Exposure | Hours to Develop Surface Haze |
|---|---|---|---|---|
| 4 | C(100)-CM(33)-TC(67) | Sanduvor ® VSU (1.0%) Tinuvin ® 622 (0.5%) | ~55% | >3000 |
| 5 | C(100)-CM(33)-TC(67) | Sanduvor ® VSU (1.0%) Tinuvin ® 622 (0.5%) Irganox ® 1010 (0.1%) | ~45% | >3000 |
| 6 | C(100)-CM(30)-TC(70) | Sanduvor ® VSU (1.0%) Tinuvin ® 622 (0.5%) | ~45% | >3000 |
| 7 | C(100)-CM(30)-TC(70) | Sanduvor ® VSU (1.0%) Tinuvin ® 622 (0.5%) Irganox ® 1010 (0.1%) | ~0 | >3000 |
| 8 | C(100)-CM(30)-TC(70) | Cyasorb ® UV-5411 (1.0%) Tinuvin ® 622 (0.5%) | ~30% | >3000 |
| 9 | C(100)-CM(30)-TC(70) | Cyasorb ® UV-5411 (1.0%) Tinuvin ® 622 (0.5%) Irganox ® 1010 (0.1%) | ~30% | >3000 |
| 10 | C(100)-TC(90)-EG(10)[c] | None | >98% | >3000 |
| 11 | C(100)-TC(90)-EG(10) | Cyasorb ® UV-5411 (1.0%) Tinuvin ® 622 (0.5%) Weston ® 618 (0.5%) | <30% | >3000 |
| 12 | C(100)-TC(94)-EG(6) | None | >98% | >3000 |
| 13 | C(100)-TC(94)-EG(6) | Cyasorb ® UV-5411 (1.0%) Tinuvin ® 622 (0.5%) | <30% | >3000 |
| 14 | C(100)-CM(64)-TC(36) | Tinuvin ® 328 (1.0%) | >90% | >3000 |

TABLE I-continued

| No. | Polymer[a] | Stabilizer[b] Formulation | % Loss In FWIS[c] On 2000 Hr. Exposure | Hours to Develop Surface Haze |
|---|---|---|---|---|
| 15 | C(100)-CM(64)-TC(36) | Sanduvor ®.VSU (1.0%) | >90% | >3000 |

[a]C = 1,4-Cyclohexanedicarboxylic Acid (100% trans);
CM = 1,4-Cyclohexanedimethanol (70% trans);
TC = 2,2,4,4-Tetramethyl-1,3-Cyclobutanediol (67% trans);
EG = Ethylene Glycol.
The numbers in parentheses indicate the mole percent of monomer in each polymer.
[b]Tinuvin 328 [UV stabilizer (2-(2'-hydroxy-3',5'-di-tert-amylphenyl)benzotriazole]
Tinuvin 622 [Hindered amine stabilizer (a polyester of succinic acid and N—β-hydroxyethyl-2,2,6,6-tetramethyl-4-hydroxypiperidine)]
Irganox 1010 [Antioxidant (pentaerythritol tetrakis(3,5-di-tertbutyl-4-hydroxy-hydrocinnamate)]
Sanduvor VSU [UV stabilizer (2-ethyoxy-2'-ethyloxanilide)]
Cyasorb UV-5411 [UV stabilizer (2-(2'-hydroxy-5-tert-octylphenyl)benzotriazole)]
Weston 618 [antioxidant (distearyl pentaerythritol diphosphite)]
[c]FWIS (flatwise impact strength) was measured according to ASTM Procedure D-256-56.

EXAMPLES 16-20

Five polymers based on the same terephthalic acid based polyester were prepared using a procedure similar to that described in Example 1. Example 16 contained no stabilizers and Examples 17 through 20 contained different combinations of UV stabilizers, antioxidants and/or HALS. Each was molded into ½ inch × 2½ inch × 1/16 inch bars using the procedure described in Example 3. Upon exposure in an Atlas XWR Weather-Ometer each example was monitored for percent loss of FWIS after 2000 hours exposure and for the number of hours to develop surface haze. The results are shown in Table II. All but one of the examples (Example 17) lost 80% or more FWIS after 2000 hours exposure. Example 17 lost approximately 65% FWIS which is almost 20% more than the worst stabilized polyester example of this invention in Table II (Example 4). All of the examples developed surface haze after less than 1000 hours exposure.

TABLE II

| No. | Polymer[d] | Stabilizer[e] Formulation | Loss In FWIS[f] On 2000 Hr. Exposure | Hours to Develop Surface Haze |
|---|---|---|---|---|
| 16 | T(100)-EG(69)-CM(31) | None | >90% | <1000 |
| 17 | T(100)-EG(69)-CM(31) | Sanduvor ® VSU (1.0%) Weston ® 619 (0.5%) | ~65% | <1000 |
| 18 | T(100)-EG(69)-CM(31) | Sanduvor ® VSU (1.0%) Weston ® 619 (0.5%) Tinuvin ® 622 (0.5%) | ~87% | <1000 |
| 19 | T(100)-EG(69)-CM(31) | Cyasorb ® UV-5411 (1.0%) Weston ® 619 (0.5%) | ~80% | <1000 |
| 20 | T(100)-EG(69)-CM(31) | Cyasorb ® UV-5411 (1.0%) Weston ® 619 (0.5%) Tinuvin ® 622 (0.5%) | ~80% | <1000 |

[d]See Footnote a of Table I for monomer code definitions.
[e]Weston 619 is the same as Weston 618; see Footnote b of Table I for additional stabilizer information.
[f]see Footnote c of Table I.

EXAMPLES 21-25

Five different terephthalic acid based polyesters were prepared using a procedure similar to that described in Example 1. The same stabilizer formulation was employed in each [Tinuvin ®P (1.0%) and Weston ®618 (0.5%)] with the exception of Example 21 which contained no stabilizer. Each was molded into ½ inch × 2½ inch × 1/16 inch bars using the procedure described in Example 3 and exposed in an Atlas XWR Weather-Ometer. The weatherability of each was determined by the number of hours to develop surface haze and the number of hours to exhibit 50% loss in FWIS. The results are shown in Table III. None of the terephthalic acid based polyesters retained surface appearance for 1500 hours and each exhibited a 50% loss in FWIS in less than 2000 hours exposure.

TABLE III

| No. | Polymer[g] | Stabilizer[h] Formulation | Time to 50% Loss FWIS[i] | Hours to Develop Surface Haze |
|---|---|---|---|---|
| 21 | T(100)-NG(100) | None | <500 | <1500 |
| 22 | T(100)-BO(100) | Tinuvin ® P (1.0%) | >2500 | <1000 |
| 23 | T(100)-CM(80)-TC(20) | Weston ® 618 (0.5%) | >1500 | <1500 |
| 24 | T(100)-CM(80)-NG(20) | Tinuvin ® P (1.0%) | >1500 | <1000 |

TABLE III-continued

| No. | Polymer[g] | Stabilizer[h] Formulation | Time to 50% Loss FWIS[i] | Hours to Develop Surface Haze |
|---|---|---|---|---|
| 25 | T(100)-TC(20)-BO(20)-CM(60) | Weston® 618 (0.5%) | >1500 | <1000 |

[g]T = Terephthalic Acid;
NG = Neopentyl Glycol;
BO = 1,4-Butanediol;
TC = 2,2,4,4-Tetramethyl-1,3-Cyclobutanediol (67% trans);
CM = 1,4-Cyclohexanedimethanol (70% trans).
[h]Tinuvin P [UV stabilizer (2-(2'-hydroxy-5'-methyl-phenyl)benzotriazole)] Weston 618 [antioxidant (distearyl pentaerythritol diphosphite)]
[i]See Footnote c of Table I.

EXAMPLES 26–31

Six polyesters derived from 1,4-cyclohexanedicarboxylic acid as the dicarboxylic acid component and, as the major glycol component, a glycol other than 2,2,4,4-tetramethyl-1,3-cyclobutanediol were prepared using a procedure similar to that described in Example 1. Each was stabilized with different stabilizer formulations with the exception of Examples 26 and 29 which contained no stabilizers. Each was molded into ½ inch × 2½ inch × 1/16 inch bars as in Example 3, exposed in an Atlas XWR Weather-Ometer and monitored for retention of impact strength (based on the number of hours of exposure till 50% loss in FWIS. The results, shown in Table IV, show that all of the polyesters lost 50% of their FWIS after less than 500 hours exposure.

TABLE IV

| No. | Polymer[j] | Stabilizer[k] Formulation | Time to 50% Loss in FWIS[l] |
|---|---|---|---|
| 26 | C(100)-CM(64)-TC(36) | None | <500 |
| 27 | C(100)-CM(64)-TC(36) | Tinuvin® P (1.0%) Weston® 618 (0.5%) | <500 |
| 28 | C(100)-CM(64)-TC(36) | Sanduvor® VSU (1.0%) Weston® 618 (0.5%) | <500 |
| 29 | C(100)-CM(100) | None | <500 |
| 30 | C(100)-CM(100) | Cyasorb® UV-5411 (1.0%) Weston® 618 (0.5%) | <500 |
| 31 | C(100)-CM(100) | Cyasorb® UV-5411 Weston® 618 (0.5%) Tinuvin® 622 (0.5%) | <500 |

[j]See Footnote a of Table I for monomer code definitions.
[k]See Footnote b of Table I for stabilizer information.
[l]See Footnote c of Table I.

The invention has been described in detail with particular reference to preferred embodiments thereof, but it will be understood that variations and modifications can be effected within the spirit and scope of the invention.

We claim:

1. A polyester composition having a 264 psi heat deflection temperature greater than 60° C. comprising
   A. a dicarboxylic acid component wherein at least a major portion of which is 1,4-cyclohexanedicarboxylic acid having a trans isomer content of at least 65%,
   B. a glycol component, wherein at least a major portion of which is 2,2,4,4-tetramethyl-1,3-cyclobutanediol,
   C. a stabilizing effective amount of the combination of
      1. at least one ultraviolet light stabilizing compound compatible with said polyester, and
      2. at least one hindered amine light stabilizing compound having the formulae

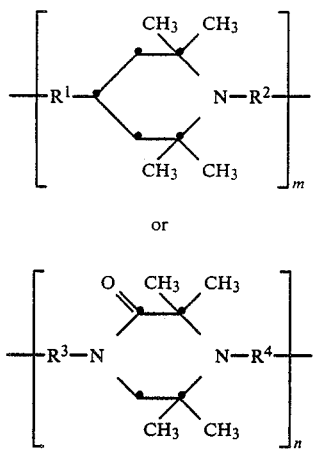

wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

2. A polyester composition according to claim 1 wherein at least one of said hindered amine light stabilizing compounds is employed in an amount of about 0.05 to about 2.0 weight percent and at least one of said ultraviolet light stabilizing compounds is employed in an amount of about 0.05 to about 5.0 weight percent, based on the weight of said polyester.

3. A polyester composition according to claim 2 wherein said ultraviolet light stabilizing compound is selected from the group consisting of
a compound having the formula

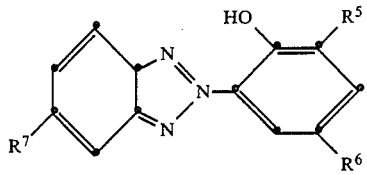

wherein $R^5$, $R^6$, and $R^7$ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; $R^7$ is also chlorine or fluorine;
a compound having the formula

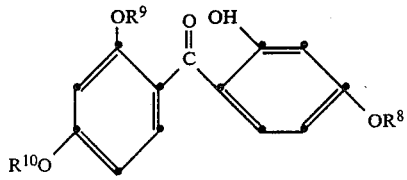

wherein $R^8$, $R^9$ and $R^{10}$ are each independently selected from hydrogen, branched or unbranched, substituted or unsubstituted alkyl having 1 to 18 carbon atoms, and alkylenecarbonyloxyalkyl having 3 to 18 carbon atoms;
a compound having the formula

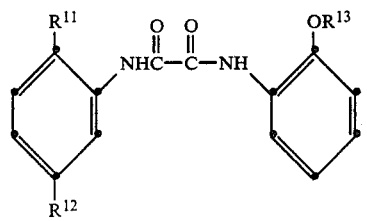

wherein $R^{11}$, $R^{12}$ and $R^{13}$ are each independently selected from hydrogen and substituted or unsubstituted, branched or unbranched alkyl radicals containing from 1 to 10 carbon atoms;
a compound of the formula

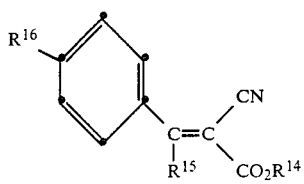

wherein $R^{14}$ and $R^{16}$ are each independently selected from substituted or unsubstituted alkyl containing from 1 to 18 carbon atoms, $R^{15}$ is hydrogen, methyl, or substituted or unsubstituted aryl having 6 to 22 carbon atoms, and $R^{16}$ is also substituted or unsubstituted alkoxy having 1 to 18 carbon atoms;
a compound having the formula

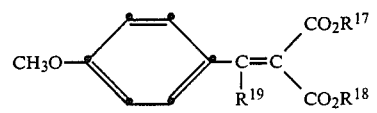

wherein $R^{17}$ and $R^{18}$ are each independently selected from substituted or unsubstituted, branched or unbranched alkyl having 1 to 18 carbon atoms and $R^{19}$ is hydrogen or methyl;
a compound having the formula

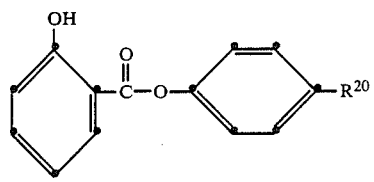

wherein $R^{20}$ is hydrogen, substituted or unsubstituted branched or unbranched alkyl or alkoxy having 1 to 18 carbon atoms.

4. A polyester composition according to claim 3 wherein said hindered amine light stabilizing compound is selected from the group consisting of bis(1,2,2,6,6-pentamethyl-4-piperidinyl)sebacate, bis(1,2,2,6,6-pentamethyl-4-piperidinyl)2-[[3,5-bis(1,1-dimethylethyl)-4-hydroxyphenyl]methyl]-2-butylpropanedioate, dimethylsuccinate polymer with 4-hydroxy-2,2,6,6-tetramethyl-1-piperdine-ethanol, and poly[(2,2,6,6-tetramethyl-4-piperidinyl)iminomethylene-2,2,6,6-tetramethyl-4-piperdinyl)imino[6-(octylamino)-1,3,5-triazine-4,2-diyl]]; and said ultraviolet light stabilizing compound is selected from the group consisting of 2-[2-hydroxy-3,5-di(α,α-dimethylbenzyl)phenyl]-2H-benzotriazole, 2-ethoxy-2'-ethyloxanilide, and 2-ethylhexyl-2-cyano-3,3-diphenylacrylate.

5. A polyester composition according to claim 4 wherein said glycol component comprises about 70-100 mole % 2,2,4,4-tetramethyl-1,3-cyclobutanediol, and about 30-0 mole % of a second glycol selected from the group consisting of polymethylene glycols having about 2 to about 10 carbon atoms.

6. A polyester composition according to claim 5 wherein said second glycol is selected from the group consisting of 1,3-propanediol; 2,2-dimethyl-1,3-propanediol; 1,4-butanediol, 1,6-hexanediol; 1,4-cyclohexanedimethanol; and 1,4-cyclohexanediol.

7. A polyester composition according to claim 6 wherein said acid component comprises about 80-100 mole % 1,4-cyclohexanedicarboxylic acid and about 20-0 mole % of a second acid selected from the group consisting of aliphatic dicarboxylic acids having about 2 to about 10 carbon atoms.

8. A polyester composition according to claim 7 wherein said second acid is selected from the group consisting of malonic acid, succinic acid, glutaric acid, adipic acid, azelaic acid, and sebacic acid.

9. A polyester composition according to claim 1 wherein said acid component comprises about 80-100 mole % 1,4-cyclohexanedicarboxylic acid and about 20-0 mole % of a second acid selected from the group consisting of aliphatic dicarboxylic acids having about 2 to about 10 carbon atoms and said glycol component comprises about 70-100 mole % 2,2,4,4-tetramethyl-1,3-cyclobutanediol, and about 30-0 mole % of a second glycol selected from the group consisting of polymethylene glycols having about 2 to about 10 carbon atoms.

10. A polyester composition according to claim 5 wherein 1,4-cyclohexanedicarboxylic acid has a 100% trans isomer content.

11. A polyester composition having an inherent viscosity of at least 0.4 and a 264 psi heat deflection temperature greater than 60° C. comprising
   A. a dicarboxylic acid component wherein at least a major portion of which is 1,4-cyclohexanedicarboxylic acid having a trans isomer content of at least 65%,
   B. a glycol component wherein at least a major portion of which is 2,2,4,4-tetramethyl-1,3-cyclobutanediol, and
   C. a stabilizing effective amount of the combination of
      1. at least one hindered amine light stabilizing compound having the formulae

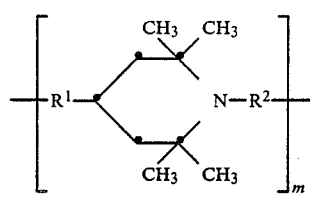

or

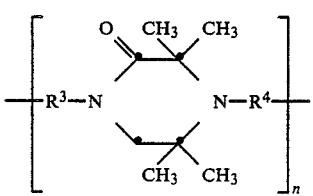

wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid;
      2. at least one ultraviolet light stabilizing compound selected from the group consisting of a compound having the formula

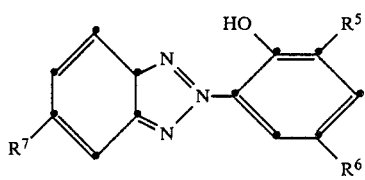

wherein $R^5$, $R^6$, and $R^7$ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; and $R^7$ is also chlorine or fluorine;

a compound having the formula

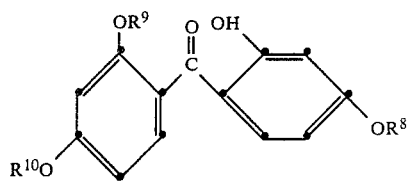

wherein $R^8$, $R^9$ and $R^{10}$ are each independently selected from hydrogen, branched or unbranched, substituted or unsubstituted alkyl having 1 to 18 carbon atoms, and alkylenecarbonyloxyalkyl having 3 to 18 carbon atoms;

a compound having the formula

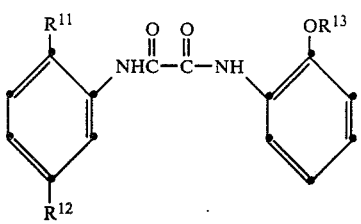

wherein $R^{11}$, $R^{12}$ and $R^{13}$ are each independently selected from hydrogen and substituted or unsubstituted, branched or unbranched alkyl radicals containing from 1 to 10 carbon atoms;

a compound of the formula

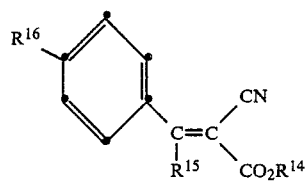

wherein $R^{14}$ and $R^{16}$ are each independently selected from substituted or unsubstituted alkyl containing from 1 to 18 carbon atoms, $R^{15}$ is hydrogen, methyl, or substituted or unsubstituted aryl having 6 to 22 carbon atoms, and $R^{16}$ is also substituted or unsubstituted alkoxy having 1 to 18 carbon atoms;

a compound having the formula

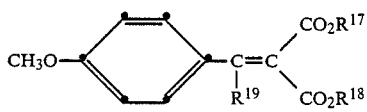

wherein $R^{17}$ and $R^{18}$ are each independently selected from substituted or unsubstituted, branched or unbranched alkyl having 1 to 18 carbon atoms and $R^{19}$ is hydrogen or methyl;

a compound having the formula

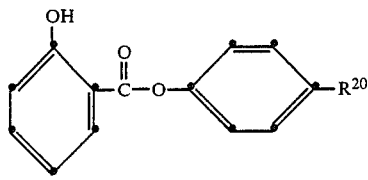

wherein R[20] is hydrogen, substituted or unsubstituted branched or unbranched alkyl or alkoxy having 1 to 18 carbon atoms.

12. A polyester composition according to claim 11 wherein at least one of said hindered amine light stabilizing compounds is employed in an amount of about 0.05 to about 2.0 weight percent and at least one of said ultraviolet light stabilizing compounds is employed in an amount of about 0.05 to about 5.0 weight percent, based on the weight of said polyester.

13. A polyester composition according to claim 11 wherein said hindered amine light stabilizing compound is selected from the group consisting of bis(1,2,2,6,6-pentamethyl-4-piperidinyl)sebacate, bis(1,2,2,6,6-pentamethyl-4-piperidinyl)2-[[3,5-bis(1,1-dimethylethyl)-4-hydroxyphenyl]methyl]-2-butylpropanedioate, dimethylsuccinate polymer with 4-hydroxy-2,2,6,6-tetramethyl-1-piperdine-ethanol, and poly[(2,2,6,6-tetramethyl-4-piperidinyl)iminomethylene2,2,6,6-tetramethyl-4-piperidinyl)imino[6-(octylamino)-1,3,5-triazine-4,2-diyl]]; and said ultraviolet light stabilizing compound is selected from the group consisting of 2-[2-hydroxy-3,5-di(α,α-dimethylbenzyl)phenyl]-2H-benzotriazole, 2-ethoxy-2'-ethyloxanilide, and 2-ethylhexyl-2-cyano-3,3-diphenylacrylate.

14. A polyester composition according to claim 11 wherein said glycol component comprises about 70–100 mole % 2,2,4,4-tetramethyl-1,3-cyclobutanediol, and about 30–0 mole % of a second glycol selected from the group consisting of polymethylene glycols having about 2 to about 10 carbon atoms.

15. A polyester composition according to claim 11 wherein said acid component comprises about 80–100 mole % 1,4-cyclohexanedicarboxylic acid and about 20–0 mole % of a second acid selected from the group consisting of aliphatic dicarboxylic acids having about 2 to about 10 carbon atoms.

16. A polyester composition according to claim 11 wherein said acid component comprises about 80–100 mole % 1,4-cyclohexanedicarboxylic acid and about 20–0 mole % of a second acid selected from the group consisting of aliphatic dicarboxylic acids having about 2 to about 10 carbon atoms and said glycol component comprises about 70–100 mole % 2,2,4,4-tetramethyl-1,3-cyclobutanediol, and about 30–0 mole % of a second glycol selected from the group consisting of polymethylene glycols having about 2 to about 10 carbon atoms.

17. A polyester composition according to claim 11 wherein 1,4-cyclohexanedicarboxylic acid has a 100% trans isomer content.

18. A polyester composition according to claim 11 wherein said inherent viscosity is at least 0.6 to about 1.6.

19. A polyester composition having an inherent viscosity of at least 0.4 and a 264 psi heat deflection temperature greater than 60° C. comprising
A. a dicarboxylic acid component wherein at least a major portion of which is 1,4-cyclohexanedicarboxylic acid having a trans isomer content of at least 65%,
B. a glycol component wherein at least a major portion of which is 2,2,4,4-tetramethyl-1,3-cyclobutanediol,
C. the combination of
  about 0.25 to about 0.5 weight percent of a polyester of succinic acid and (N-β-hydroxyethyl-2,2,6,6-tetramethyl-4-hydroxypiperidine, and about 0.5 to about 1.0 weight percent of 2-ethoxy-2'-ethyloxanilide.

20. A polyester composition according to claim 19 wherein said glycol component comprises about 70–100 mole % 2,2,4,4-tetramethyl-1,3-cyclobutanediol and about 30–0 mole % 1,4-cyclohexanedimethanol, based on a total glycol content of 100 mole %.

21. A polyester composition according to claim 20 wherein 1,4-cyclohexanedimethanol has a trans isomer content of about 70%.

22. An article of manufacture produced from the polyester according to claim 1.

23. An article of manufacture produced from the polyester according to claim 11.

24. An article of manufacture produced from the polyester according to claim 19.

25. The method for stabilizing a polyester composition having a 264 psi heat deflection temperature greater than 60° C. said polyester comprising a dicarboxylic acid component wherein at least a major portion of which is 1,4-cyclohexanedicarboxylic acid having a trans isomer content of at least 65% and a glycol component wherein at least a major portion of which is 2,2,4,4-tetramethyl-1,3-cyclobutanediol, said method comprising the step of incorporating into said polyester composition a stabilizing effective amount of the combination of
1. at least one ultraviolet light stabilizing compound compatible with said polyester, and
2. at least one hindered amine light stabilizing compound having the formulae

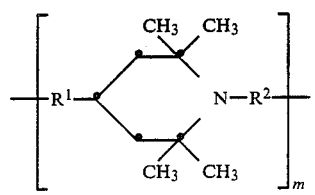

or

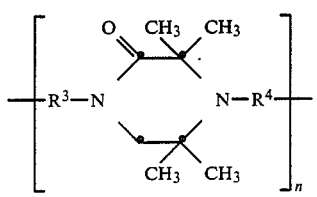

wherein m and n are each integers of from 1 to 20, R[1], R[2], R[3] and R[4] are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

* * * * *